Nov. 22, 1966  J. I. MASTERS  3,289,099

COHERENT LIGHT OSCILLATORS

Filed Feb. 27, 1963  4 Sheets-Sheet 1

INVENTOR.
JOSEPH I. MASTERS
BY Roden & Schiller
ATTORNEYS

INVENTOR.
JOSEPH I. MASTERS
BY Rosen & Schiller
ATTORNEYS

INVENTOR.
JOESPH I. MASTERS
BY
ATTORNEYS

United States Patent Office 3,289,099
Patented Nov. 29, 1966

3,289,099
COHERENT LIGHT OSCILLATORS
Joseph I. Masters, Concord, Mass., assignor to Technical Operations, Inc., Burlington, Mass., a corporation of Delaware
Filed Feb. 27, 1963, Ser. No. 261,327
7 Claims. (Cl. 331—94.5)

This invention relates to coherent light oscillators, or lasers, sometimes called "optical masers," and more particularly to methods and means for increasing the peak power of pulsed lasers.

During oscillation in a laser (e.g., a ruby rod), stimulated emission decreases the mean lifetime in the upper, or "excited" quantum state to very much less than that which is characteristic of spontaneous emission alone, thereby limiting the excess population attainable with available pumping power to not much more than the threshold value. It has been pointed out that since a ruby optical maser requires feedback, greater population inversion can be achieved by temporarily decreasing the effective reflectivity, and oscillation can thus be delayed until a time later than that at which it would normally begin. See, for example, R. J. Collins and P. Kisliuk "Control of Population Inversion in Pulsed Optical Masers by Feedback Modulation," Journal of Applied Physics, volume 33, No. 6, pages 2009–2011, June 1962; and F. J. McClung and R. W. Hellwarth "Giant Optical Pulsations from Ruby," ibid., volume 33, No. 3, pages 828–829, March 1962. These publications describe techniques for peak power enhancement of pulsed lasers which employ control or modulation of feedback by shuttering or by rotation of an external reflector. Collins and Kisliuk report peak power of the spikes at least six times greater than observed without the feedback modulation. In these techniques the shuttering action must be carefully synchronized with the laser pump cycle to maximize the stored energy prior to laser action. In the case of a rotating shutter the laser pulse may be cut off by the shutter before a complete dumping of excitation is possible. Furthermore, these techniques involve the use of rotating components or external fields.

These feedback modulation techniques have been referred to as "Q-Spoiling." By virtue of the losses introduced by removal of feedback, the Q is destroyed to the extent that the usual oscillation condition, (1−losses) × gain shall be equal to or greater than unity, is not satisfied, and the return of reflectivity causes the expected increase in peak power output.

According to the present invention, the peak power of a pulsed laser may be increased, by about two orders of magnitude (e.g., 50–100 times), by a technique which employs an easily destroyable energy absorber in the laser enclosure to increase the preoscillation losses of the laser, and degrade the quality factor $Q_c$, that is, "spoil the Q," of the enclosure. In general, this technique contemplates the use of active laser material having at least one of the usual enclosure reflectors externally located, and the energy absorber is located between the active laser material and the external reflector. In one embodiment of the invention, there is employed a laser rod (e.g., ruby) with one of the usual reflectors external to the rod. Between this reflector and the rod is placed an optically flat, essentially nonabsorbing, heat-resistant slab substrate, such as glass, on which has been deposited a thin film of a partially transparent material. The film has as one of its physical properties a large absorption coefficient in the vicinity of the laser transition frequency. The presence of such an absorber internal to the laser enclosure, of course, reduces $Q_c$ and increases in a controlled manner the threshold for the onset of laser oscillations. If the optical pump energy supplied to the active medium is sufficient to exceed the new threshold, then oscillations commence at an abnormally high population inversion $\Delta N$ but, unfortunately at a low $Q_c$. In this system, however, the resulting internal laser beam must now pass through the absorbing film, and this causes the film to rapidly vaporize or explode, or causes the film effectively to disappear in the small region through which the beam passes.

Thus success of this technique requires that the film be rapidly vaporized by the internal laser beam in a time $t_v$ that is short compared with the lifetime of stimulated radiation in the laser. Experience has shown that $t_v$ should be in the order of 0.1 μsec. or smaller. Ideally, then, $Q_c$ will change back to its normal large value while $\Delta N$ is still large, thereby producing the desired high power output pulse.

Although the optical disappearance of the film cannot be expected to take place completely and instantly because of the film's mass, the possible production of residue matter, and the possible optical absorption of the resulting vapor, experiments indicate a rapid rate of reduction in absorption due to breakdown of the film.

The nature of the present invention, as exemplified by the absorbing film concept, implies advantageous differences when compared with either or both of the prior electro-optical or rotational techniques mentioned above. Primarily these differences are simplicity; essentially no moving parts or external fields are required and no critical alignment problems exist. In addition, once the high power laser pulse is established, it is not cut off as is inherently the case in some rotating systems. Thus, total dissipation of excess population in the excited state by stimulated emission oscillation is limited in principle only by the unspoiled Q of the system. Furthermore, there are no unusual limitations in power handling capabilities, since what remains immediately after a small region of the film explodes is essentially a conventional laser geometry, in which $Q_c$ is restored to its unspoiled value. By definition "threshold" is the time for maximum excitation by a given pump energy pulse. Therefore synchronization problems are essentially non-existent in the present invention, since laser action commences slightly above threshold in the present absorbing-film Q-spoiling system. The resulting laser output is characterized by a single giant pulse of microsecond duration whose rise time (in the 20 to 40 nanosecond range) is at least as fast as reported for Q-spoiling by Kerr cell shutters.

It is the general object of the present invention to alter the output character of pulsed lasers, and in particular to increase the peak power thereof. It is a more particular object of the invention to provide novel methods and means, in particular, purely passive means, to increase the peak power of pulsed lasers.

The invention will now be described with reference to the accompanying drawings, wherein:

FIG. 1 diagrammatically illustrates an embodiment of the invention;

Figure 1:
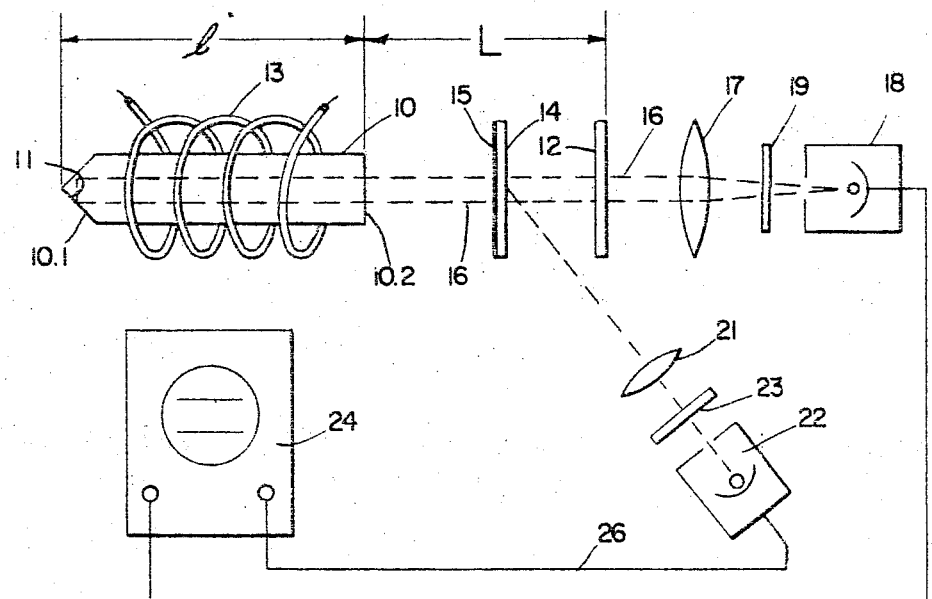
Figure 6:
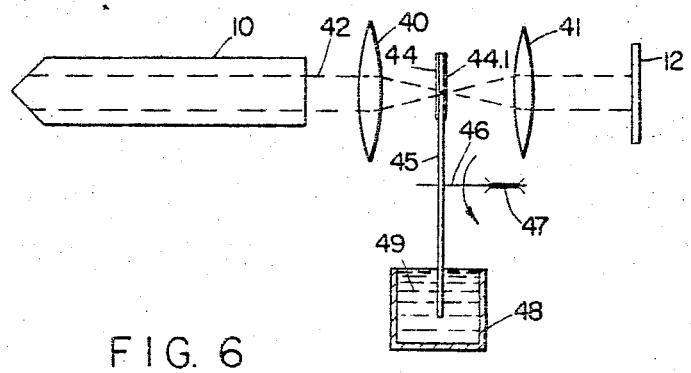
Figure 6A:
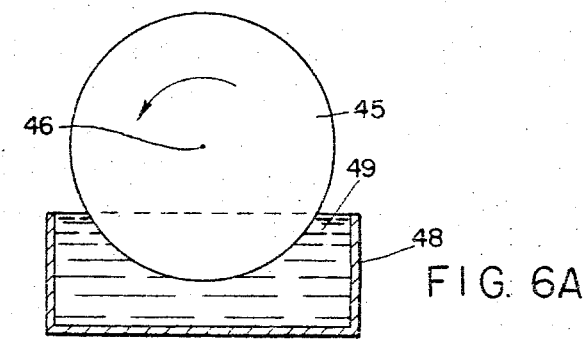
Figure 7:
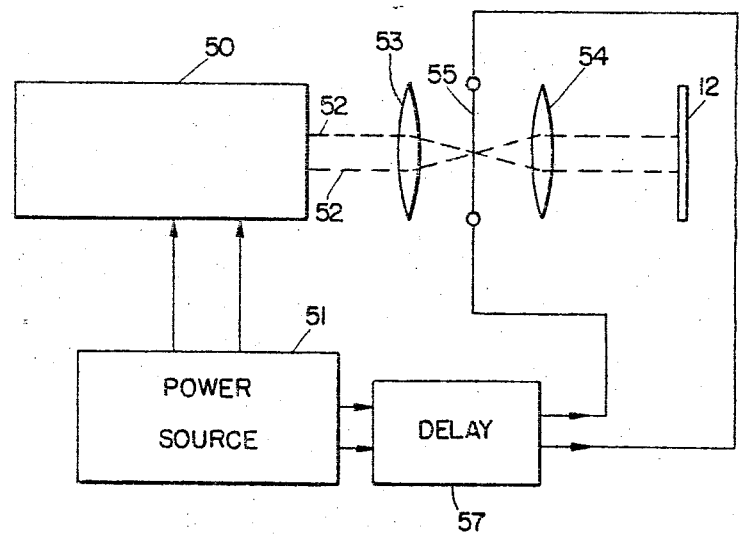
Figure 8:
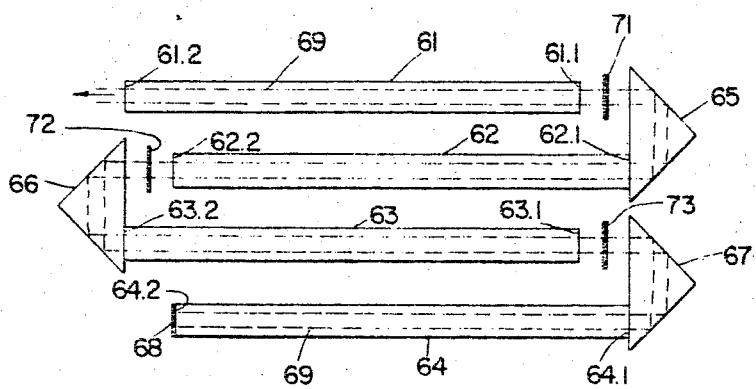
Figure 9:
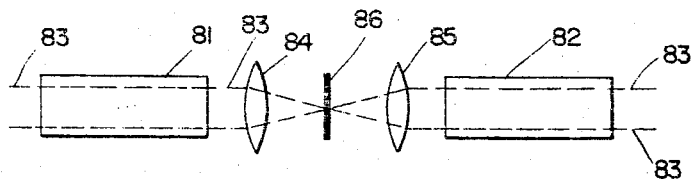
Figure 10:
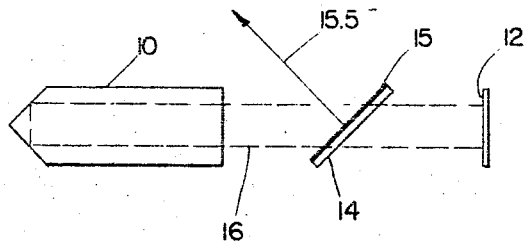

FIGS. 6 and 6A diagrammatically illustrate another embodiment of the invention;

FIG. 7 diagrammatically illustrates still another embodiment of the invention;

FIG. 8 illustrates the application of the invention to coupled lasers;

FIG. 9 diagrammatically illustrates another application of the invention to coupled lasers; and FIG. 10 illustrates a modification of embodiments according to FIG. 1.

Referring to FIG. 1, a body 10 of an active laser medium, which may be solid (e.g., a ruby rod) or gaseous, or any other suitable material now or hereafter known, is of elongated form, having a length "$l$," and is provided at one end 10.1 with a preferably totally reflecting mirror 11. By "active laser medium" is meant a medium containing atoms having the property that, when they are struck by stimulating photons, they emit a cascade of photons with a high degree of spatial coherence; as is well-known, the growth of such a cascade into a wave in the laser enclosure is the laser oscillation. Here the term "coherent" is used in the strict sense of modern optics (see, for example, Born and Wolf, "Principles of Optics," chap. 10, Pergammon Press, New York, N.Y., 1959). The second end 10.2 of the body 10 is without a reflector, so that the wave can pass through this end substantially without reflection (e.g., not more than about 8–10% reflection). An external partially reflecting front surface mirror 12 is located a distance "L" from the second end 10.2 of the body 10, and serves, with the first mirror 11, to define the laser enclosure.

A conventional helical flash lamp 13 is used to pump the laser.

A glass slab 14 having a wave absorbing film 15 on one surface thereof is located between the second end 10.2 of the rod 10 and the external mirror 12. The laser beam path is represented by dashed lines 16. A first lens 17 serves to focus the laser beam passing through the external mirror 12 on a first photo-multiplier 18 through an attenuating neutral density filter 19. A second lens 21 serves to focus nonlaser radiant emission, from the point of incidence of the laser beam on the film 15, on a second photo-multiplier 22 through a filter 23, which may be a narrow-band interference filter. The two photo-multiplier outputs are co-recorded on the same time scale by a dual beam oscilloscope 24, to which the photo-multipliers 18 and 22 are coupled via lines 25 and 26, respectively.

In the search for a suitable film certain obvious physical properties must be considered such as the following: low reflection coefficient, high absorption coefficient, low values for atmospheric boiling or decomposition temperature and associated energy, and no strong absorption by any residue and/or rapidly dispersing vapor.

In one experiment employing the arrangement of FIG. 1, with a ruby laser ($v \cong 6940$ A.) the absorbing film 15 employed a blue dye triphenylmethane-acetone solution which was applied by a simple dipping process to the glass substrate 14 as a uniform half-wave length thick film. In this thickness the concentration may be controlled to give approximately 75% absorption with a nominally small reflection coefficient.

The deposited film was introduced into the laser cavity using a ¼ in. diameter ruby rod 10 of 90° orientation with one end 10.1 cut for total internal reflection 11. With such a rod, the film 15 can be set into the laser cavity at Brewster's angle, and advantage can be taken of the polarized output from the rod 10 to cut out reflection losses from the film. This is illustrated in FIG. 10, where the arrow 15.5 represents the general direction of light reflected from the film 15. An external dielectric mirror 12 of 90% reflectivity in the red, displaced about $L=20$ cm. from the rod, was the opposing reflector of the Fabry-Perot type enclosure. The laser rod was pumped by a conventional helical flash lamp 13 that, in the absence of the absorbing film 15, produced laser oscillation with an input electrical energy of 1800 joules. Introduction of the lossy absorber 15 increased the threshold to about 2600 joules. The system was then operated at a pump energy some 20% above the new threshold. Subsequent laser action was measured by a well-attenuated first photo-multiplier 18 that detected the axial beam. In addition, the second photomultiplier 22, which was preceded by a narrow-band interference filter 23, monitored the non-laser radiant emission from the point of incidence on the absorbing film 15. Triggering of the oscilloscope sweeps was initiated by early stimulated emission radiation entering the axial detector 18.

Figure 3:
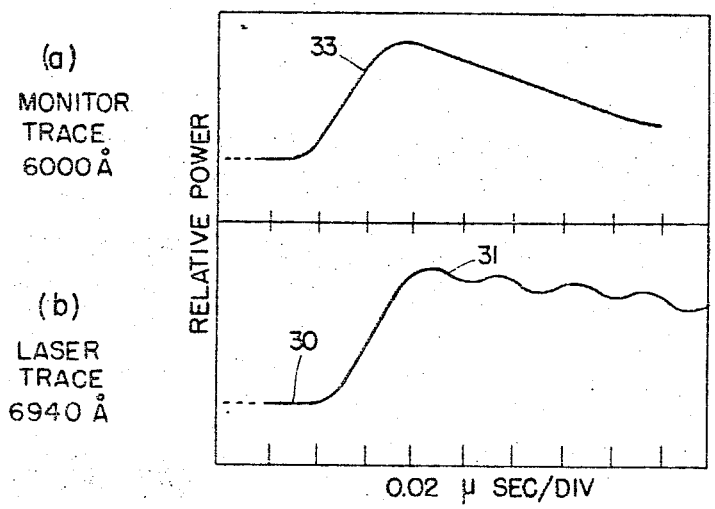
FIG. 3 illustrates photomultiplier output waves obtained with an arrangement according to FIG. 1.
Figure 4:
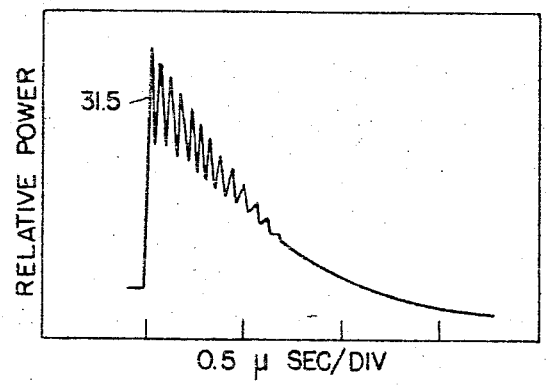
FIG. 4 illustrates a laser spike obtainable with the arrangement of FIG. 1.
Figure 5:
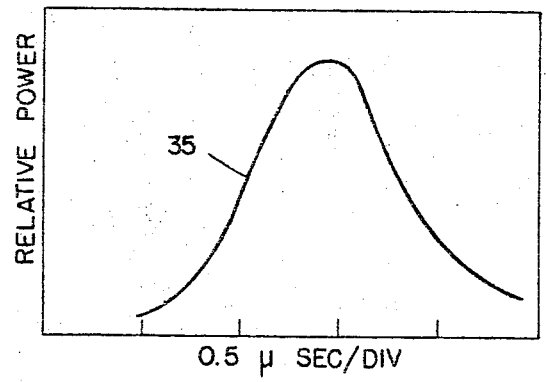
FIG. 5 illustrates a normal laser spike as compared with FIG. 4.

Typical axial laser output under these conditions, as shown in FIG. 3b (sweep speed 20 nsec./div.), is characterized by an initial lower power level 30 that lasts for about 0.1 $\mu$sec. or less, followed by a single large spike 31 that rises in less than 50 nsec. and decays in about 1 to 2 $\mu$sec. The laser spike in this case is modulated at a frequency of ~30 mc., presumably caused by an internal relaxation phenomenon. FIG. 3a shows the monitor pulse 33 from the film disintegration, which appears to precede the laser spike by some 10 nsec. and falls more rapidly than the laser output. No modulation is exhibited. In FIG. 4 a similar laser spike 31.5 at a sweep speed of 0.5 $\mu$sec./div. is shown. FIG. 5 shows the symmetry and slow rise of a typical normal laser spike 35 at the same sweep speed.

Figure 2:
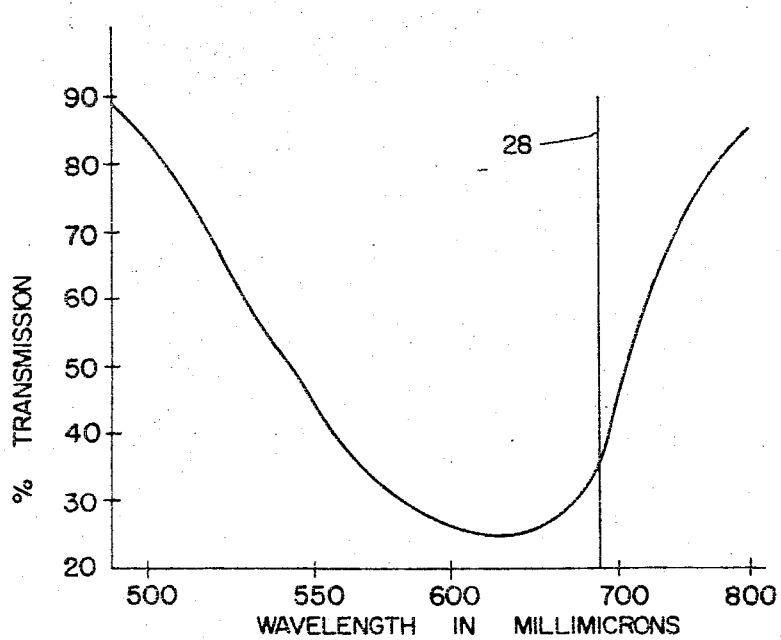
FIG. 2 illustrates the physical properties of a film material suitable for use in the invention.

FIG. 2 shows the percent transmission vs. wavelength in millimicrons of blue dye triphenylmethane, deposited from a solution in acetone and alcohol to a thickness less than one wavelength at about 6900 Angstroms (approx. 0.25 to $.5 \times 10^{-6}$ meters thick). This film was found to be about 30% absorbing at 6900 Angstroms. The laser frequency is represented in FIG. 2 by a vertical line 28. Using this film, a gain in peak power between 50 and 100 times was observed over the same system with identical conditions but in the absence of the absorbing film 15. Blue dye triphenylmethane was obtained commercially as "Victoria Blue."

Other materials which may be used as the absorbing film 15 include metal films, such as silver or aluminum. The latter has been found to leave a residue, and not to explode as cleanly as Victoria Blue.

Laser pulse height and rise time estimates are conservative because of scope speed limitations (scope rise time 20 nsec.).

It is theorized that the ~0.1 $\mu$sec. delay prior to the appearance of the spike 31 is characterized by low Q laser output during which the temperature of the film 15 is rising. The next observed phenomenon appears to be radiant emission from the region of film explosion in the selected band, followed in about 10 nsec. by the rise of the large laser spike. Although the exploding film emission (FIG. 3a) seems to be of relatively long duration, lasting almost as long as the entire laser pulse, apparently the reduction in film opacity (for Victoria Blue) is a much faster phenomenon, since the rise time of the laser pulse is typically 40 nsec. or less and often approaches the 20 nsec. scope resolution limit.

In the absence of time-resolved spectrographic data, the hole-burning in the film layer is difficult to study as a function of time, because strong radiant emission from the region tends to swamp test light signals used to measure growth of the hole. Examination of the absorbing film after each laser pulse, however, shows a fairly clean hole of about ⅛ in. diameter with a very thin transparent residue film remaining on the glass substrate. The large size of the hole in conjunction with the prolonged emission from the point of incidence on the film (FIG. 1) indicate the possibility of growth of the beam thickness with time or mode switching.

FIG. 6 illustrates an arrangement which brings about an enhanced Q-spoiling effect by reducing, by optical techniques, the size of the internal laser beam at the point of incidence on the absorbing film. This arrangement substantially increases the radiant flux density at the film surface and, therefore, enhances the speed of film disappearance. In FIG. 6, a pair of lenses 40, 41 interior to the laser cavity is used to bring the collimated laser beam 42 to a focus at the film surface 44. The laser rod 10 and external mirror 12 are as in FIG. 1. Since such an arrangement requires careful alignment and positioning, it should be executed on an optical bench provided with an autocollimator. A further advantage of this approach is well known. (J. A. Baker and C. W. Peters, Appl. Optics 1, 674 (1962).) Mode selection is attainable when the internal laser beam is optically constrained in this manner to pass only through a very small opening produced in the film. That is, in accordance with diffraction theory the restriction of a small hole in the beam implies that the laser is more likely to oscillate in low order modes that tend to fill the laser rod's cross-section or to give it a large effective aperture in the optical sense, with a subsequent gain in volume efficiency.

The embodiment of FIG. 6 incorporates as a further feature a replaceable film 44. The optical glass flat disc 45 is axially mounted on a rotatable spindle 46 held in a bearing 47 for rotation by any suitable means (not shown). A trough 48 contains a solution 49 of a suitable dye (e.g., Victoria Blue). Rotation of the disc 45 coats the outer portions of both sides continuously with the dye to provide films on both sides. This has been found to introduce no difficulty; the two films 44, 44.1 burn off essentially simultaneously. When the replaceable film mechanism is used, the system can be repeatedly pulsed. This mechanism can be disposed to set in the film at Brewster's angle, as is described above. Results obtained with focusing lenses according FIG. 6 indicate that peak power gains at least as great as observed without lenses are attainable.

FIG. 7 illustrates an arrangement in which the energy absorber or Q-spoiler 55 is destroyable by means external to the laser system. A block 50, which represents the active medium and its pump, is connected to a power source 51 for flashing the pump lamp and emitting a laser beam represented by dashed lines 52. Lenses 53 and 54 are employed, as in FIG. 6, to focus the beam on the absorber 55 and collimate the beam at the external mirror 12. The power source is also connected across the absorber 55, through a suitable delay mechanism or circuit 57, if desired. The energy absorber 55 may be a film of a metal or other electrical conductor which can be destroyed by a pulse of electrical energy, as in the familiar exploding-wire phenomenon. The power source 51, which may be suitable both for flashing a laser pump lamp and for exploding such a film, then explodes the film 55 in synchronism with flashing the lamp. A suitable time delay in exploding the film may be provided by the delay mechanism 57, in order to assure appropriate population inversion in the active medium.

FIGS. 8 and 9 illustrate arrangements employing exploding films according to the invention to control the onset of laser action in coupled laser systems. First, second, third and fourth laser rods 61, 62, 63 and 64, respectively, are disposed side-by-side and parallel to each other. The first and second rods 61 and 62 are coupled at their right-hand ends 61.1 and 62.1, respectively (in FIG. 8), by a first totally-internally-reflecting prism 65. The second and third rods 62 and 63 are coupled at their left-hand ends 62.2 and 63.2, respectively, by a second totally-internally-reflecting prism 66. The third and fourth rods 63 and 64 are coupled at their right-hand ends 63.1 and 64.1, respectively, by a third totally-internally-reflecting prism 67. The right-hand end 61.1 of the first rod 61 is spaced from the first prism 65, and an exploding film 71 according to the present invention is set into the laser cavity in the intervening gap thus provided. Similarly, additional exploding films 72 and 73 are set into the laser cavity in gaps provided, respectively, between the left-hand end 62.2 of the second rod 62 and the second prism 66, and between the right-hand end 63.1 of the third rod 63 and the third prism 67. The left-hand end 64.2 of the fourth rod 64 is provided with a reflector 68, such as a silvered mirror, for the laser wave 69. The left-hand end 61.2 of the first rod 61 is the output end of the system.

FIG. 9 shows two laser rods 81 and 82 of a linearly-coupled laser system. The laser beam or wave is represented by dashed lines 83. Lenses 84, 85 between the rods focus the laser beam between them, and an exploding film 86 according to the present invention is set into the laser cavity at the focus of these lenses.

In either of the illustrated coupled laser systems, the use of an exploding film according to the invention will bring about the advantages described above in connection with a single body of active laser material.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Laser system comprising: a negative temperature medium containing atoms having the property that, when they are struck by stimulating photons, they emit a cascade of coherent photons, said medium providing a path within the medium along which a collection of such coherent photons can build up into a wave directed along said path, an optical resonant cavity containing said medium, reflector means forming the boundaries of said cavity and defining a laser enclosure for said wave, and means for attenuating said wave located in said enclosure in the path of said wave for degrading the quality factor of said enclosure, said attenuating means including a layer of material which in one physical state is only partially transparent to, and is capable of substantial attenuation of and exhibits low reflectivity to light energy in a prescribed optical frequency band containing the frequency of said wave, said material being capable of being so acted upon by said energy traversing the same at an intensity level above a prescribed threshold value as to destroy said material in said path in a time interval which is short compared with the lifetime of stimulated radiation in said medium thereby substantially to remove said material from said path, said layer presenting its smallest dimension in said path.

2. Laser system according to claim 1 including lens means in said enclosure arranged to concentrate said wave on a relatively small portion of said attenuating means.

3. Laser system according to claim 1 in which said attenuating means is an organic film having a maximum thickness of approximately one wavelength of said wave.

4. Laser system according to claim 3 in which the frequency of said wave is in the band centered approximately at 6940 Angstroms and said attenuating means is a film of a blue dye approximately one-half said wavelength thick.

5. Laser system according to claim 4 in which said dye is triphenylmethane.

6. Laser system according to claim 1 in which said negative temperature medium is contained in two separate bodies spaced apart with a portion of said path between them, and said attenuating means is in said portion of said path.

7. Laser system according to claim 1 in which said attenuating means is set into said enclosure substantially at Brewster's angle relative to the direction of polarization of said wave, whereby to reflect polarized light away from said path.

(References on following page)

References Cited by the Examiner

UNITED STATES PATENTS

| | | | |
|---|---|---|---|
| 2,929,922 | 3/1960 | Schawlow et al. | 331—94.5 X |
| 3,179,899 | 4/1965 | Fox | 331—94.5 |
| 3,187,270 | 6/1965 | Kogelnik et al. | 331—94.5 |

FOREIGN PATENTS 608,711  3/1962  Belgium.

OTHER REFERENCES

Collins et al.: Control of Population Inversion in Pulsed Optical Masers by Feedback Modulation, J. Applied Phys., vol. 33, No. 6 (June 1962), pp. 2009–2011.

JEWELL H. PEDERSEN, *Primary Examiner.*

W. L. SIKES, *Assistant Examiner.*